(12) United States Patent
Smith (10) Patent No.: US 6,654,239 B2
(45) Date of Patent: Nov. 25, 2003

(54) DOUBLE-ACTION CD DRIVE EJECT MECHANISM

(75) Inventor: Kelly K. Smith, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 48 days.

(21) Appl. No.: 10/029,739

(22) Filed: Dec. 18, 2001

(65) Prior Publication Data

US 2003/0112597 A1 Jun. 19, 2003

(51) Int. Cl.[7] .................................................. G06F 1/16
(52) U.S. Cl. ........................ 361/685; 361/683; 361/686; 361/747
(58) Field of Search ................................. 361/683–686, 361/724–728, 747

(56) References Cited

U.S. PATENT DOCUMENTS 5,305,180 A * 4/1994 Mitchell et al. ............ 361/685

* cited by examiner

*Primary Examiner*—Darren Schuberg
*Assistant Examiner*—Yean Hsi Chang (57) ABSTRACT

The present invention provides a retaining system for an ejectable mass storage device in the housing of a computer server. The retaining system allows for the mass storage devices to be installed or removed without the use of tools. In a preferred embodiment, an ejection system capable of retaining and ejecting an ejectable mass storage device includes a lock member, an eject member, and a drive ejector. The mass storage device preferably includes a receiving zone adapted to receive a retractable tooth located on the lock member. The eject member preferably includes a body that contacts the drive ejector, which subsequently ejects the mass storage device.

12 Claims, 10 Drawing Sheets

DOUBLE-ACTION CD DRIVE EJECT MECHANISM

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates to a structural method of mounting mass storage devices into a computer housing. More precisely, the present invention relates to an ejection assembly allowing the installation and removal of one or more mass storage devices, without the use of tools.

2. Background of Relevant Art

The present invention relates to an ejection system. It is particularly beneficial for securing ejectable mass storage devices in a computer system such as a server. The following background and description of the preferred embodiments describes the ejection system in that context. However, the scope of the preferred embodiments and the claims which follow should not be so limited, unless otherwise explicitly stated.

The necessity for specialized computer equipment has increased dramatically over recent years. Corporations, both large and small, as well as individual consumers have come to depend on computers to enhance and assist them in a broad assortment of tasks. For the individual or small business, personal computers are typically relatively compact and streamlined, often compromising a monitor, a keyboard, a mouse, and a CPU "box" that sits on a desktop or on the floor. These personal computers, although considered compact when deployed in relatively small numbers, can be quite cumbersome and bulky when deployed in larger quantities. It is not uncommon for an organization to require several computers to act as servers controlling their local area networks. For larger corporations that require numerous servers, the traditional CPU package is not practical to house servers. For such operations, an industry standard EIA (Electronics Industries Alliance) rack is often used to contain servers in a stacked arrangement that uses the available space more efficiently.

Such electronics racks are relatively simple structures that closely resemble an open-frame cabinet without shelves. Computer server/component racks are typically constructed with perforated, hinged front-doors, rigid sides and a removable rear panel. Industry standard 19" EIA electronics racks are designed typically to house a column of electronics packages that are 17¾" in width and with varying depths. The height of an electronics package can vary but, to be compatable with the rack mounting structure, must be an integer multiple of an EIA unit called simply the "U." An EIA U is 1.75 inches. Electronic equipment generally has a height in multiples of "Us" e.g., 1U (1.75"), 2U (3.50"), 3U (5.25"), etc. Although it is preferred that the height of the electronics components be a multiple of the standard EIA unit U, the dimension of the EIA unit is understood to represent a maximum allowable height, including both the height of the component and any clearance required. This amount of clearance aides in the installation of the rack mounted electronics and promotes interference free insertion and removal.

Typically, electronic components may be secured within the rack using a pair of drawer slides. The drawer slides, usually ball-bearing supported rails, are secured in place within the rack frame. Corresponding rails are located on the side surfaces of the electronics component to be mounted, thus allowing the component to be pulled in and out of the rack frame easily to allow quick and frequent access.

As the computing needs of both large and small businesses increase, there is increasing demand for computer servers to become smaller and more compact. This demand is coupled with the demand that the systems be easier to maintain and service. A typical server comprises at least one, and often more than one, of each of the following components: system board including processors and memory; power supplies; mass storage devices or disk drives, including hard disks, floppy drives, CD-ROM drives, etc.; peripheral component interface (PCI) buses, and cooling fans. Mounting all of these components in a densely packed server, some as small as 1U or 2U, creates many interface issues associated with maintaining and accessing the server.

Of special importance are disk drives such as CD-ROM and DVD drives, which provide the functions of data transfer and software installation. For larger corporations, as well as smaller corporations, it may not be economical to purchase server computers with these drives in every unit. To date, a solution has been to purchase external drives that connect via wireline to a port that gives access to an internal PCI bus. One drive can be used to sequentially connect to a number of servers. Unfortunately, this configuration is time consuming to set up and cumbersome. In addition, by using an intermediate connection (i.e., wireline), data transfer is slower due to translational differences between the computer and the external drive.

Therefore, there remains a need in the art for an arrangement that allows for easy installation and removal of internal mass storage devices from a server computer without using any tools. The present invention overcomes the deficiencies of the prior art while focusing on these needs.

BRIEF SUMMARY OF THE INVENTION

The present invention overcomes the deficiencies of the prior art by providing a system to retain an ejectable mass storage device in the housing of a computer server. The retaining system allows for the mass storage devices to be installed or removed without the use of tools.

In a preferred embodiment, an ejection system capable of retaining and ejecting an ejectable mass storage device includes a lock member, an eject member, and a drive ejector. The mass storage device preferably includes a receiving zone adapted to receive a retractable tooth located on the lock member. The eject member preferably includes a body that contacts the drive ejector, which subsequently ejects the mass storage device.

BRIEF DESCRIPTION OF THE DRAWINGS

For a more detailed description of the preferred embodiment of the present invention, reference will now be made to the accompanying drawings, wherein.

DETAILED DESCRIPTION OF THE PREFERRED EMBODIMENTS

In order to fully describe the preferred embodiment of the present invention, reference will be made throughout this description to a computer server. The server referenced has a mass storage device retained using one embodiment of the present invention. It is understood that the principles and concepts of the present invention are not limited to use in a server used as an example and can be used to retain any number of devices in any application. The scope of the invention is only limited by the claims and not by this description.

Figure 1:
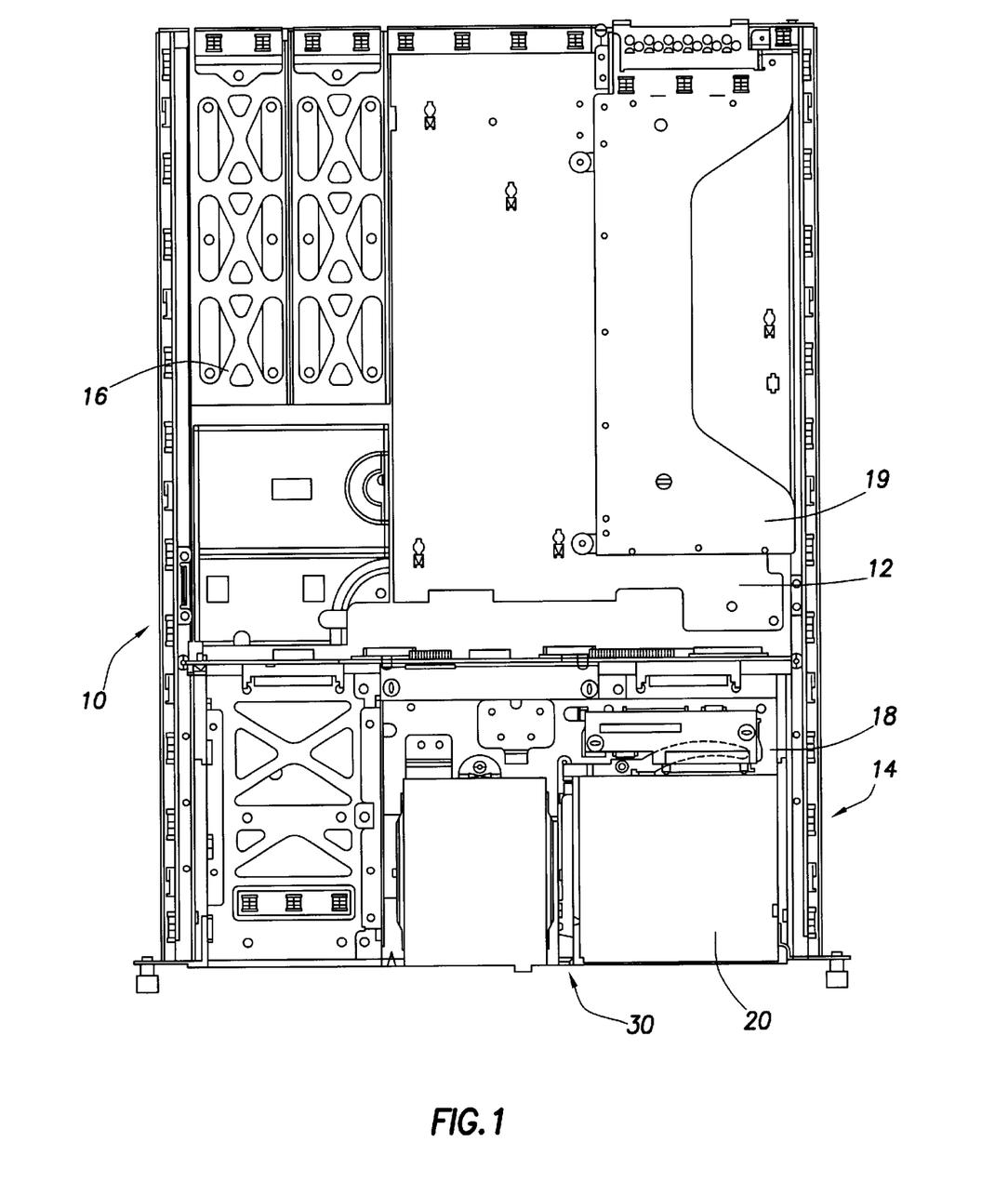
FIG. 1 is a perspective view of a dense computer server in accordance with a preferred embodiment of the present invention.

FIG. 1 illustrates a server assembly 10 incorporating one embodiment of a mass storage device ejection assembly 30. Server assembly 10 includes a chassis 14, a system board 12, mass storage device 20, power supplies 16, and a circuit card assembly 19. Chassis 14 is preferably constructed from a hard resin or metal and serves as a housing for system board 12, mass storage device 20, power supplies 16, and circuit card assembly 19.

Figure 2:
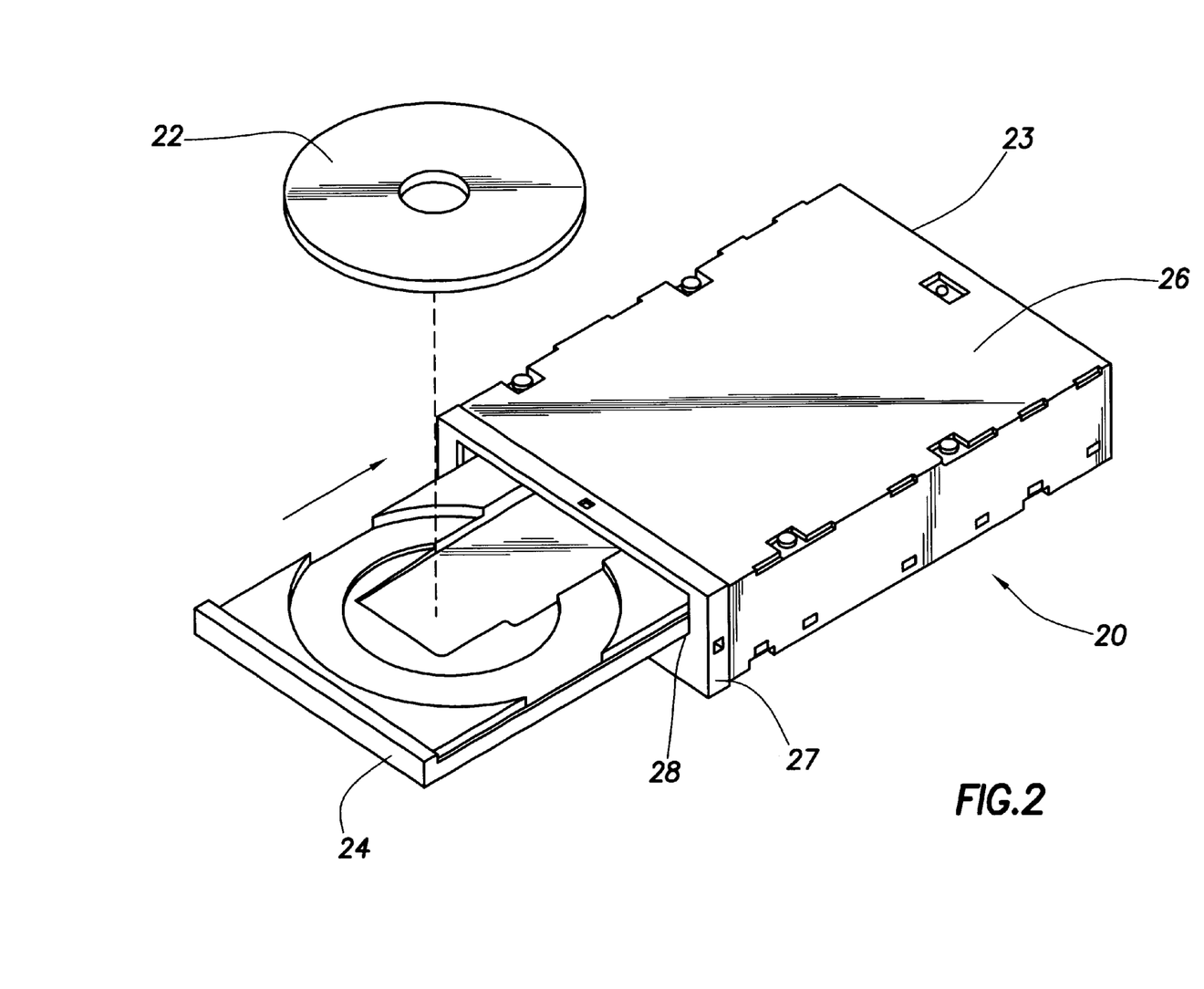
FIG. 2 is a perspective view of a mass storage device in accordance with a preferred embodiment of the present invention.

Referring now to FIG. 2, the mass storage device 20 is preferably configured to be a CD-ROM drive or a CD-R drive or the like for playing back or recording and playing back a disk such as an optical disk 22. The mass storage device 20 is roughly constructed from a main body 23, a connector 25, and a disk tray 24. Connector 25 allows mass storage device 20 to receive power, communications, etc. from server assembly 10 via a docking connector 56. Disk tray 24 is movable in the forward and backward direction (horizontal direction) with respect to the main body 23 for transporting the optical disk 22.

The main body 23 includes a circuit substrate assembly (not shown) and a mechanism assembly (not shown) arranged on the circuit substrate assembly. Main body 23 is preferably housed within a casing 26. The casing 26 is preferably comprised of thin metal plates, and at the front of the casing 26, there is mounted a front panel 27 having an opening 28.

Figure 3A:
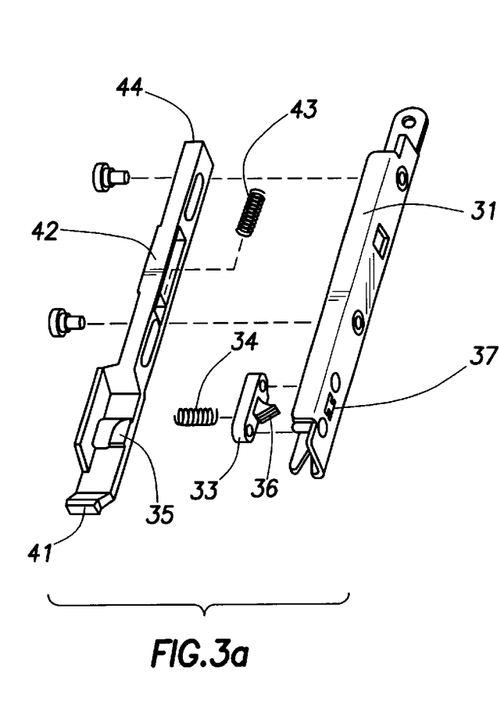
FIGS. 3a and 3b are exploded views of an ejection assembly in accordance with a preferred embodiment of the present invention.
Figure 3B:
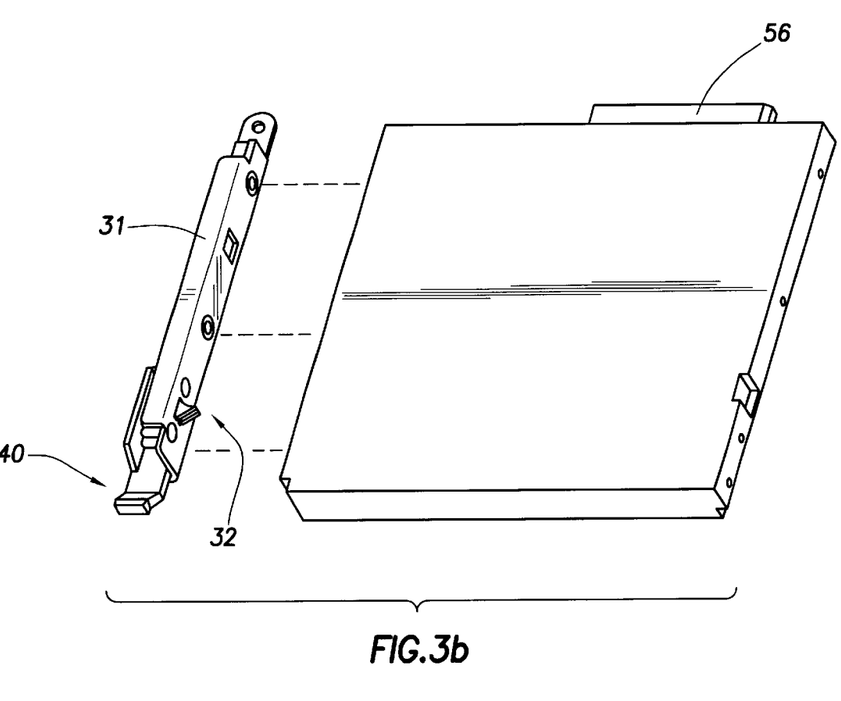

Referring now to FIGS. 3a and 3b, ejection assembly 30 preferably includes a lock member 32 and an eject member 40 mounted in an ejection casing 31. Ejection casing 31 is preferably connected to chassis 14 on a receiving platform 18 via pins (not shown) or other attachment means. Lock member 32 and eject member 40 are preferably spring-loaded. The lock member 32 includes a deadbolt 33, a spring 34, and a sliding mechanism 35. When the lock member 32 is engaged, a retractable tooth 36 on deadbolt 33 protrudes through an opening 37 in ejection casing 31 and is caught in a receiving zone 38 in mass storage device 20 so as to lock mass storage device 20 into place.

The eject member 40 includes a body 42 and a spring 43. Body 42 includes a handle end 41 and a contact end 44. Similar to lock member 32, eject member 40 is housed within ejection casing 31. In a preferred embodiment, eject member 40 and lock member 30 are interconnected.

Figure 4:
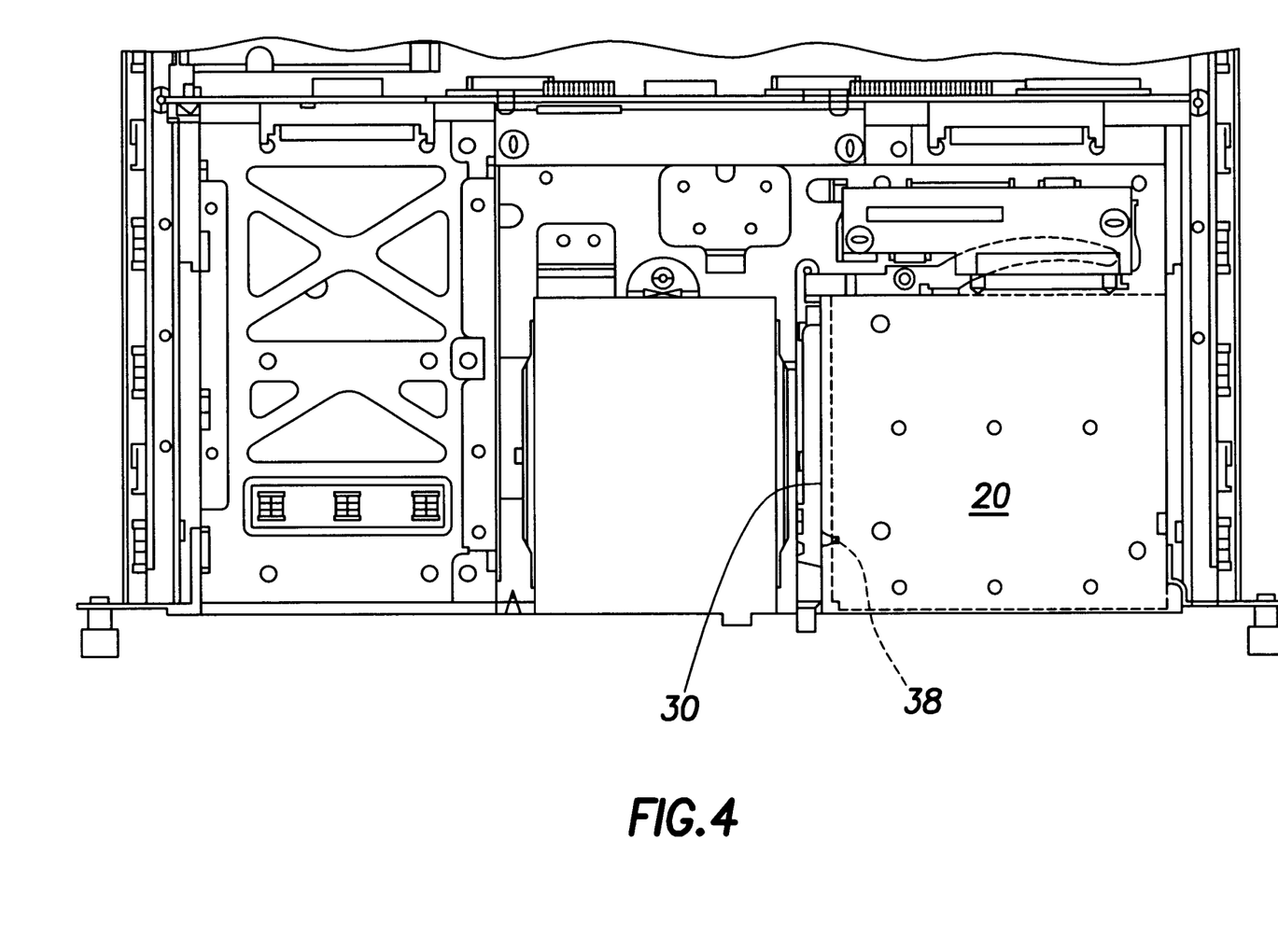
FIG. 4 is a perspective view of an installed ejection assembly in accordance with a preferred embodiment of the present invention.
Figure 5:
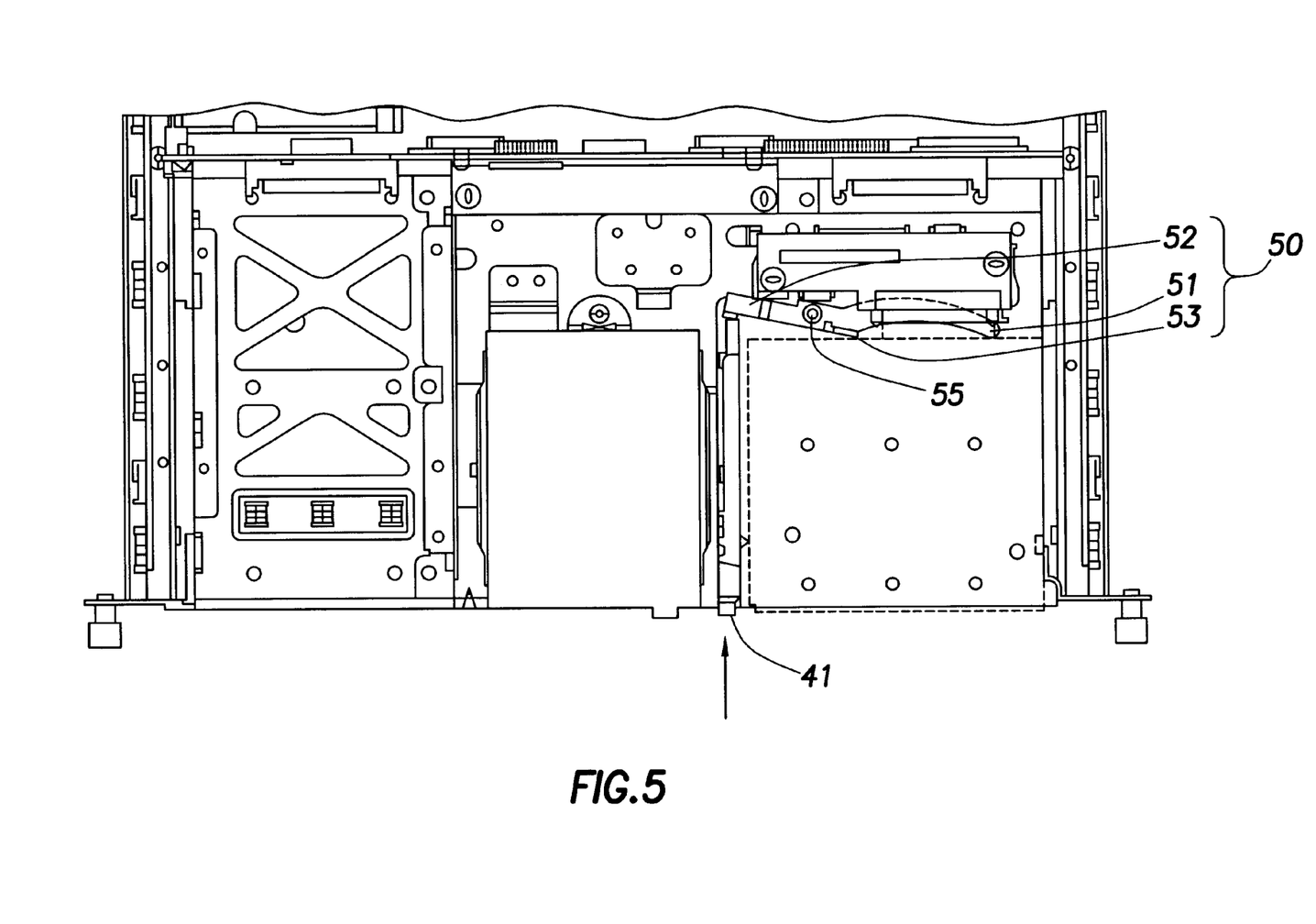
FIGS. 5–10 are perspective views of a mass storage device in accordance with a preferred embodiment of the present invention in a variety of configurations.
Figure 6:
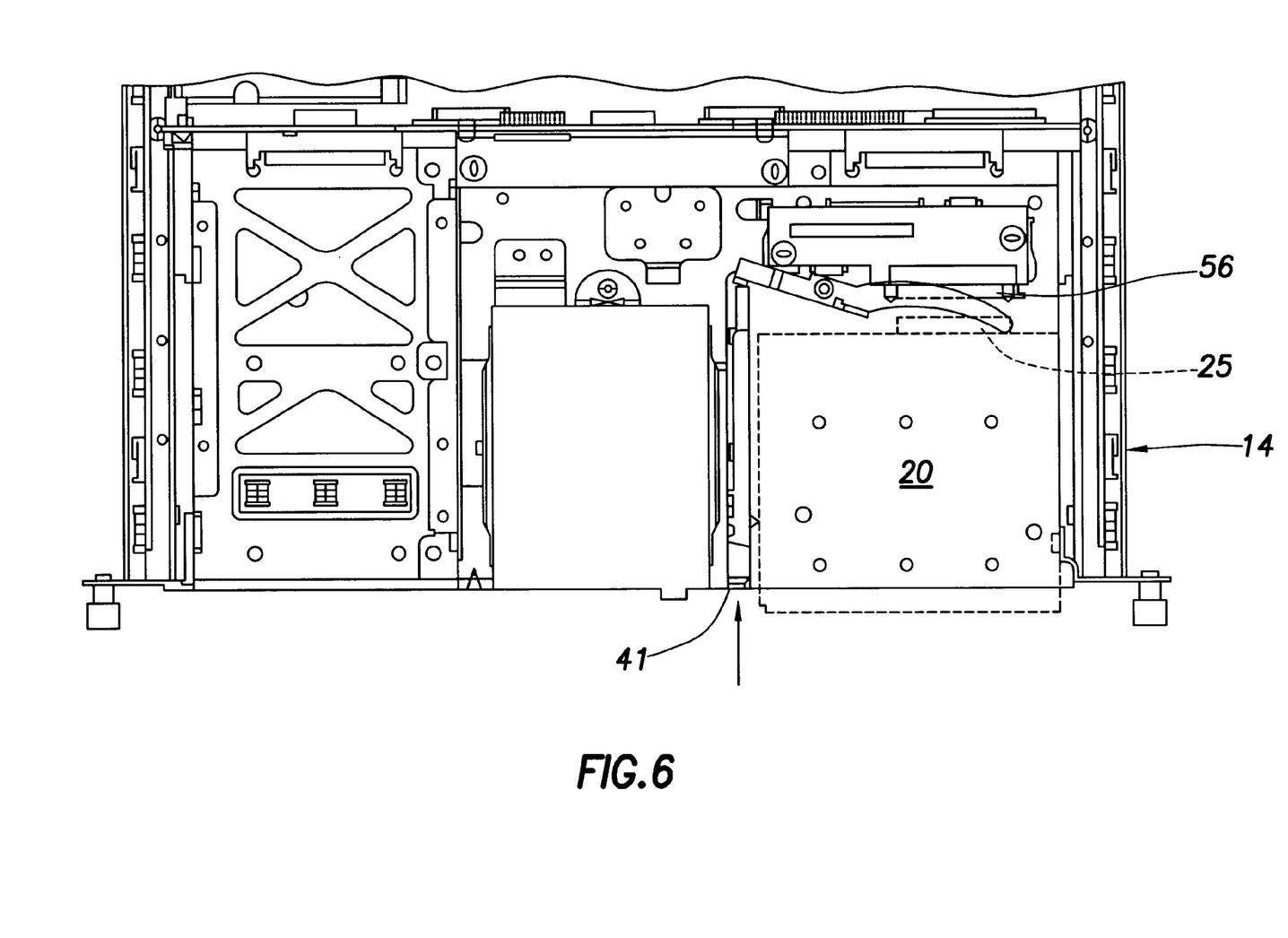
Figure 7:
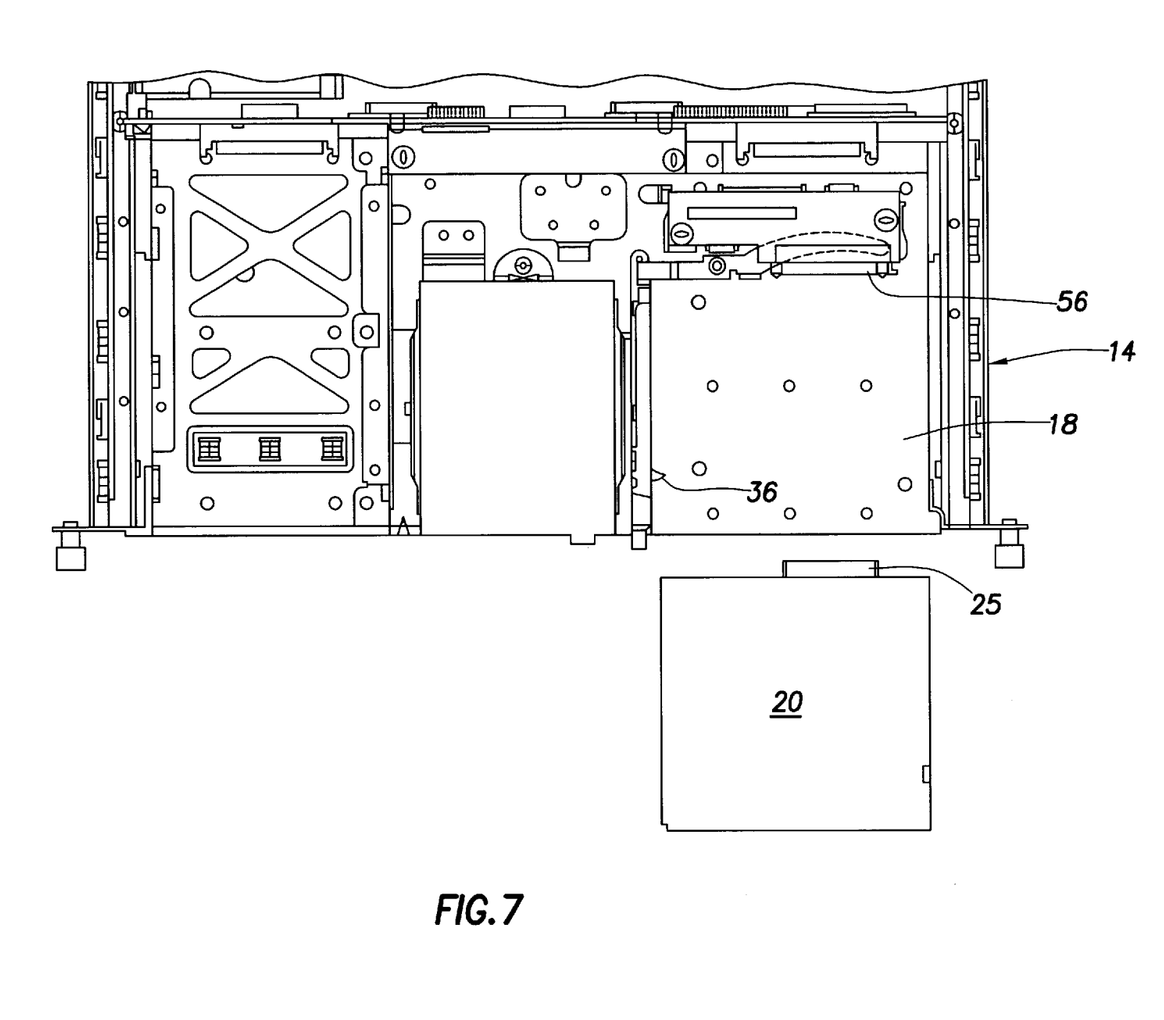
Figure 8:
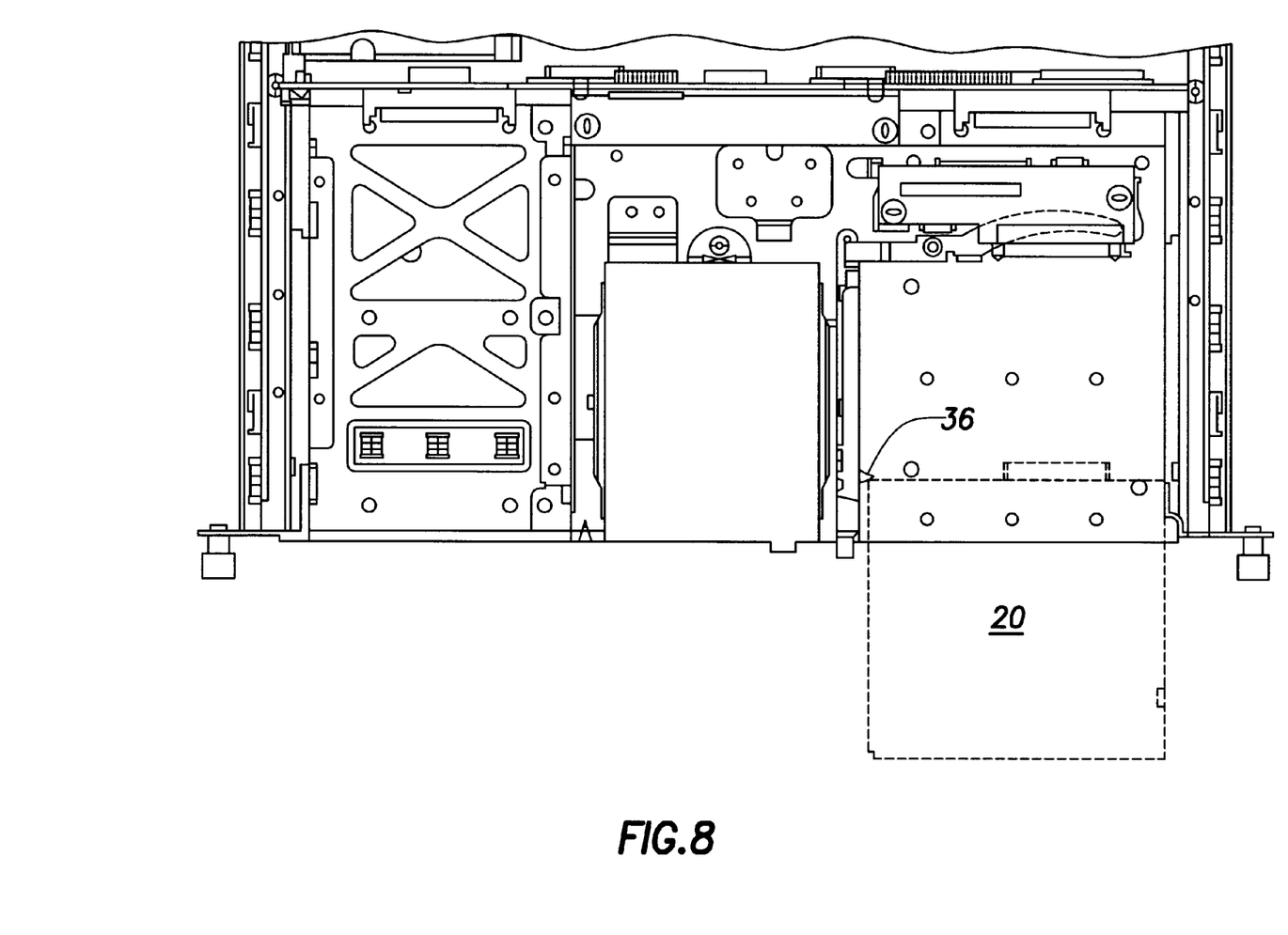
Figure 9:
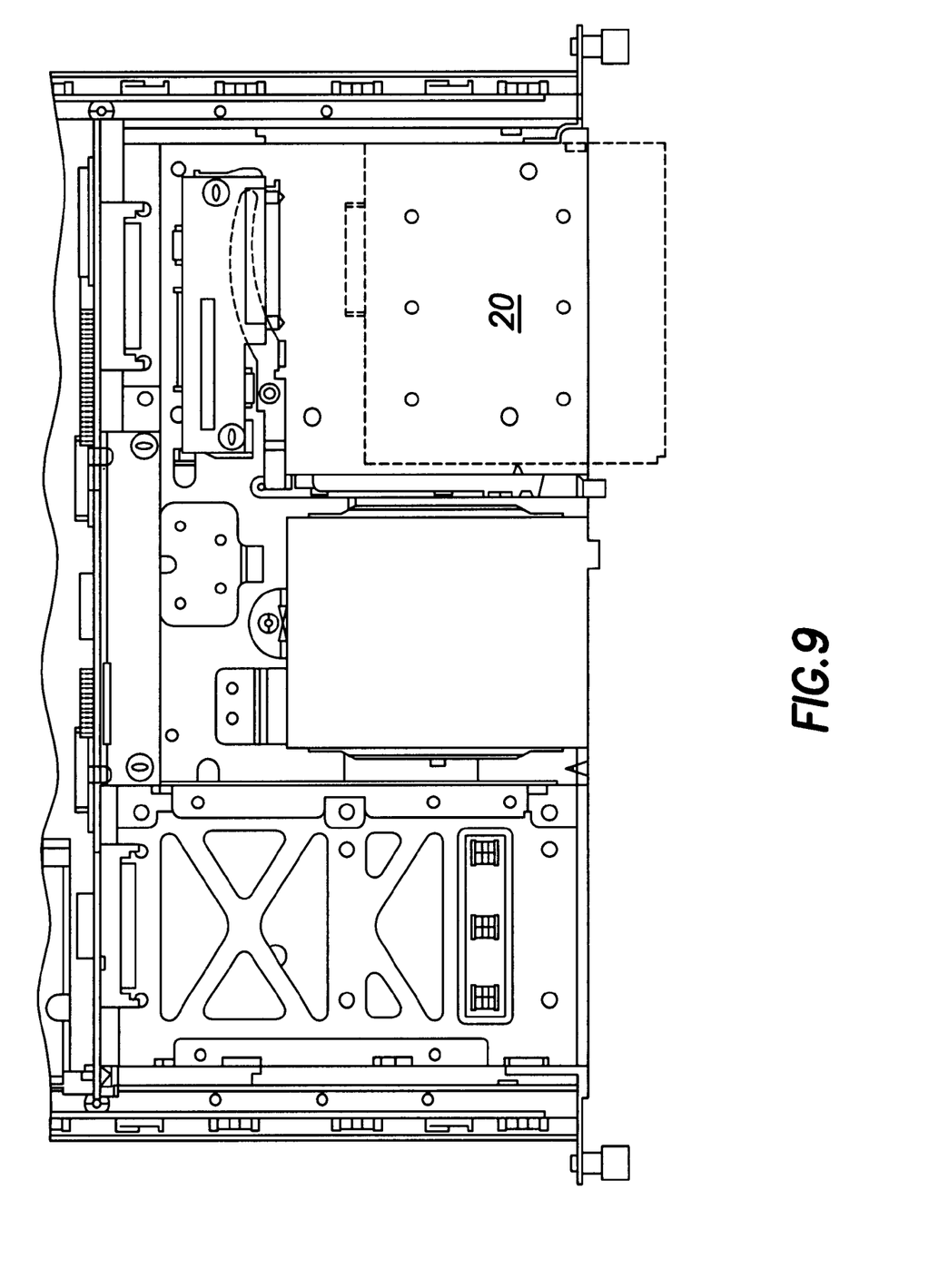
Figure 10:
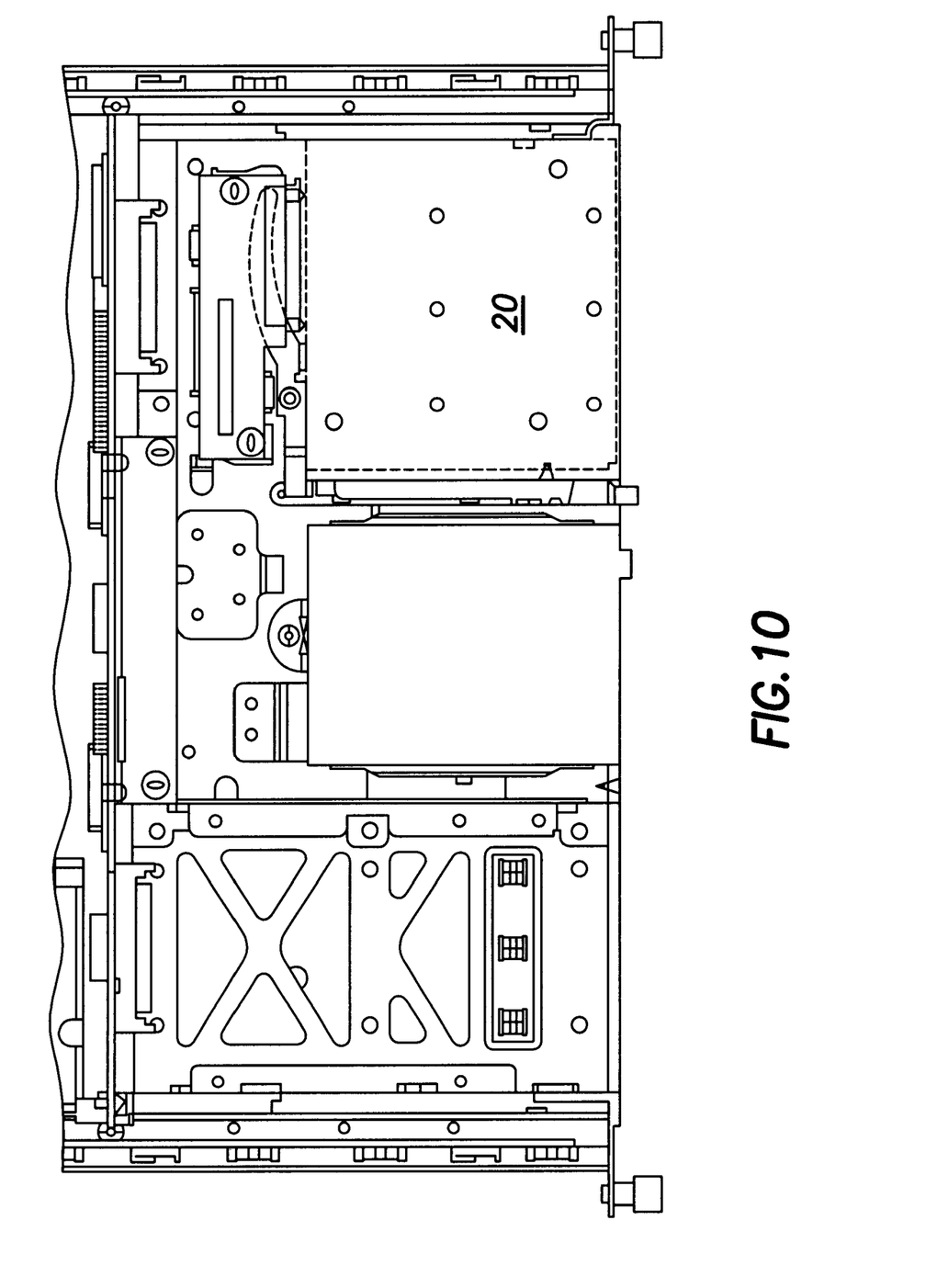

In FIG. 4, ejection assembly 30 and mass storage device 20 are shown installed, with lock member 32 engaged. Referring now to FIGS. 5 and 6, to remove mass storage device 20, the handle end 41 of eject member 40 is pressed in. This forces body 42 to slide in and contact end 44 to contact base 52 of drive ejector 50. Drive ejector preferably includes an arm 51, a base 52, and an elbow 53. Drive ejector 50 is moved in a clockwise rotation around a pivot 55, forcing elbow 53 to contact mass storage device 20 connector 25 and disconnect it from docking connector 56. When the body 42 is fully slid in, arm 51 pushes mass storage device 20 out of chassis 14, which allows mass storage device 20 to be removed by hand.

Spring 43 limits the distance body 42 may travel. For example, when spring 43 is fully compressed, body 42 is fully pushed in. Conversely, when spring 43 is relaxed, body 43 is in its normal position.

The lock member 32 is simultaneously disengaged by the following means. When eject member 40 is pressed in, a portion of sliding mechanism 35 slides behind deadbolt 33, moving it away from ejection casing 31 adjacent to mass storage device 20. As a result, because retractable tooth 36 is located on deadbolt 33, tooth 36 is subsequently disengaged from the receiving zone 38 of mass storage device 20, thereby permitting mass storage device 20 to be removed. Spring 34 provides tension on deadbolt 33, allowing it to move away from ejection casing 31 adjacent to mass storage device 20 when body 42 is pushed in, and keeping it near ejection casing 31 adjacent to mass storage device 20 (and retractable tooth 36 protruding through opening 37) when body 42 is in its normal position.

Referring now to FIGS. 7–10, mass storage device 20 is reinstalled by sliding it onto platform 18 in chassis 14. Initially, mass storage device 20 makes contact with tooth 36, which automatically slides out of the way. When mass storage device 20 is fully slid onto platform 18, mass storage device 20 connector 25 engages docking connector 56 and tooth 36 engages receiving zone 38 of mass storage device 20, locking mass storage device 20 into chassis 14.

The eject member 40 allows the mass storage device 20 to be installed or removed any number of times without the use of tools. The lock member 32 allows the computer to be handled without concern of the mass storage device falling out.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

What is claimed is:

1. A computer comprising:
   a chassis having a front panel, a first side panel, a second side panel, and a rear panel all mounted on a base and forming a rectangular enclosure;
   a system board attached to said chassis;
   an ejectable mass storage device having a receiving zone adapted to receive a retractable tooth; and
   an ejection system attached to said chassis comprising:
      an ejection assembly formed integrally within a casing, the casing being independent from the chassis; and
      a drive ejector;
      wherein said ejection assembly comprises a retractable tooth for engaging said mass storage device and said ejection assembly contacts drive ejector to eject said mass storage device.

2. The computer of claim 1 wherein said ejection assembly comprises a lock member and an eject member.

3. The computer of claim 2 wherein the lock member and eject member are spring-loaded.

4. The computer of claim 1 wherein the mass storage device may be installed or removed without any tools.

5. An ejection assembly capable of retaining an ejectable mass storage device on a platform of a computer chassis, the mass storage device having a receiving zone adapted to receive a retractable tooth, the assembly comprising:

a lock member having the retractable tooth for engaging the receiving zone the mass storage device; and an eject member, wherein the lock member and eject member are formed integrally within a casing, the casing being independent from the platform.

6. The assembly of claim 5 wherein the lock member and eject member are spring-loaded.

7. The assembly of claim 5 wherein the mass storage device may be installed or removed without any tools.

8. An ejection system capable of retaining and ejecting an ejectable mass storage device on a platform of a computer chassis, the mass storage device having a receiving zone adapted to receive a retractable tooth, the system comprising:

a lock member having the retractable tooth for engaging the receiving zone of the mass storage device; and an eject member having a body that contacts a drive ejector; and a drive ejector that ejects the mass storage device;

wherein the lock member and eject member are formed integrally within a casing, the casing being independent from the platform.

9. The assembly of claim 8 wherein the lock member and eject member are spring-loaded.

10. The system of claim 8 wherein the mass storage device may be installed or removed without any tools.

11. A method for installing an ejectable mass storage device in a computer, the method comprising:

inserting the mass storage device in the computer on a receiving platform of a computer chassis having an ejection system attached to the platform comprising an ejection assembly having a retractable tooth for engaging the mass storage device and a drive ejector, wherein the ejection assembly is formed integrally within a casing, the casing being independent from the platform.

12. A method for retaining an ejectable mass storage device in a computer, the method comprising:

inserting the mass storage device in the computer on a receiving platform of a computer chassis having an ejection system attached to the platform comprising an ejection assembly having a retractable tooth for engaging the mass storage device and a drive ejector; and engaging the tooth in the mass storage device, wherein the ejection assembly is formed integrally within a casing, the casing being independent from the platform.

* * * * *